US012634011B2

(12) United States Patent
Polehn et al.

(10) Patent No.: US 12,634,011 B2
(45) Date of Patent: May 19, 2026

(54) RECONFIGURABLE INTELLIGENT FREE SPACE OPTICAL COMMUNICATION SYSTEM

(71) Applicant: Verizon Patent and Licensing Inc., Basking Ridge, NJ (US)

(72) Inventors: Donna L. Polehn, Mercer Island, WA (US); Mark T. Watts, Newport, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 252 days.

(21) Appl. No.: 18/463,583

(22) Filed: Sep. 8, 2023

(65) Prior Publication Data

US 2025/0088276 A1     Mar. 13, 2025

(51) Int. Cl.
H04B 10/29          (2013.01)

(52) U.S. Cl.
CPC .................................... H04B 10/29 (2013.01)

(58) Field of Classification Search
CPC .... H04B 10/29; H04B 7/04013; H04B 7/145; H04B 7/15528; H04B 10/11; H04B 10/112; H04B 10/1123; H04B 10/1129
See application file for complete search history.

(56) References Cited

U.S. PATENT DOCUMENTS

2023/0421241 A1 * 12/2023 Meyer ................ H04B 7/04013

* cited by examiner

*Primary Examiner* — Hibret A Woldekidan

(57)          ABSTRACT

A device may include a first plurality of microelectromechanical system (MEMS) elements. Each of the MEMS elements may include a mirror configured to reflect a radio frequency (RF) signal propagating through a free space to the mirror and whose surface orientation is configurable based on signals from a controller. The device may also include the controller. The controller may be configured to: receive a configuration message from a cellular network component over a radio frequency (RF) control channel; extract configuration parameter values for one or more of the MEMS elements; and configure the one or more of the MEMS elements by sending control signals corresponding to the configuration parameter values.

20 Claims, 11 Drawing Sheets

Figure 6A:
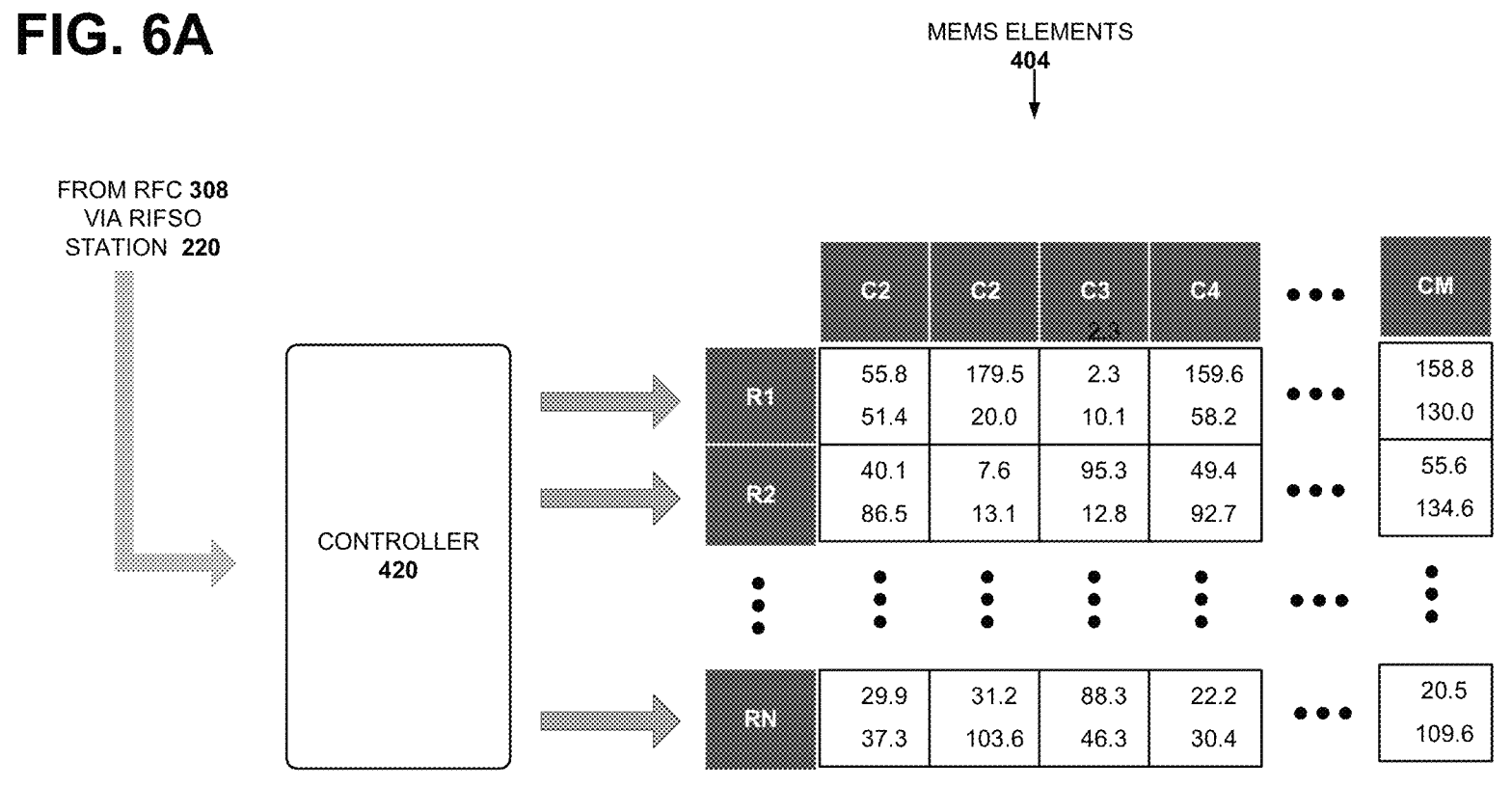

MEMS ELEMENTS 404 →

FROM RFC 308
VIA RIFSO
STATION 220

CONTROLLER 420

| | C1 | C2 | C3 | C4 | ... | CM |
|---|---|---|---|---|---|---|
| R1 | 55.8 51.4 | 179.5 20.0 | 2.3 10.1 | 159.6 58.2 | ... | 158.8 130.0 |
| R2 | 40.1 86.5 | 7.6 13.1 | 95.3 12.8 | 49.4 92.7 | ... | 55.6 134.6 |
| ... | ... | ... | ... | ... | ... | ... |
| RN | 29.9 37.3 | 31.2 103.6 | 88.3 46.3 | 22.2 30.4 | ... | 20.5 109.6 |

| FRAME START 702 | RIFSO ID 704 | CELL ID 706 | CONTROL PARAMETER 708 | ERROR CORRECTION 710 |

750 →

| FRAME START 702 | RIFSO 704 | CELL ID 706 | SENSOR PARAMETER 712 | ERROR CORRECTION 710 |

OBTAIN LOCATION AND ORIENTATION INFORMATION OF UEs, RIFSO STATIONS, AND RIFSO DEVICES
802

OBTAIN LOCATION INFORMATION OF OBJECTS AND INTERFERENCE
804

DETERMINE CONFIGURATION PARAMETER VALUES
806

GENERATE CONFIGURATION MESSAGES; SEND CONFIGURATION MESSAGES
808

RECEIVE CONFIGURATION MESSAGES; CONFIGURE COMPONENTS
810

SEND REPLY
812

800

900

RECONFIGURABLE INTELLIGENT FREE SPACE OPTICAL COMMUNICATION SYSTEM

BACKGROUND INFORMATION

A reconfigurable intelligent surface (RIS) is a structure that may be used for directing Radio Frequency (RF) signals. A RIS may reflect an incident RF beam in one or more directions, depending on the settings of constituent elements of the RIS. Multiple RISs may be positioned at various locations between a transmitter and a receiver, to select particular signal paths for improved signal reception.

In a typical transmission-reception scheme, signals propagate directly from the transmitter to the receiver. If a medium is present between the transmitter and the receiver, however, the medium may block or attenuate the signal. For example, a building, trees, vehicles, a hill, a body of air with moisture, etc., can disperse, refract, block, or degrade the signal. When positioned at strategic locations, RISs can steer the signals to circumvent the medium or avoid the attenuation.

BRIEF DESCRIPTION OF THE DRAWINGS

FIG. 5 depicts example components of a Microelectromechanical system (MEMS) element of a RIFSO device, according to an implementation;

FIG. 6A depicts example control signals at MEMS elements of a RIFSO device, according to an implementation;

FIG. 6B depicts example detected signals at sensor elements of a RIFSO device, according to an implementation;

DETAILED DESCRIPTION OF EXAMPLE EMBODIMENTS

The following detailed description refers to the accompanying drawings. The same reference numbers in different drawings may identify the same or similar elements. As used herein, the term "free space" may refer to an empty space without or devoid of an optical medium, except air. For example, if a signal travels through a free space, the signal may travel directly through the free space (perhaps filled with air) without an optical fiber of another type of medium.

Systems and methods described herein relate to Reconfigurable Intelligent Surface Free Space Optical (RIFSO) devices. Future networks may use optical components for establishing communication links over free space. For example, Sixth Generation (6G) networks may use optical components, such as Free Space Optical (FSO) devices to achieve the next-order-of-magnitude throughput and ultra-low latencies—optical transit times are much shorter in free space than in other typical optical media. However, due to high path-loss at these frequencies, inter-site distances between FSO devices are expected to be relatively large (e.g., on the order of 200 to 300 meters). This foreshadows increasingly large capital outlays and expense budgets, and hence decreasing Return-On-Investment (ROI) and growing Operational Expenditure (OPEX) (e.g., tower rent, fiber backhaul costs, etc.) if the FSO technology is applied using the traditional macro and small cells.

In particular, an FSO device can cover only a relatively small area due to path-loss characteristics and the eye-safety power limitations. Accordingly, constructing a free space optical network would require many more nodes (e.g., 100 times more nodes) to cover the same area as a typical mid-band small cell. If constructed in the traditional way, a free space optical network would require power, a number of fiber pole attachments, and other support structures that render the solution cost prohibitive to deploy on a large scale.

The systems and methods described herein relate to using RIFSO devices to overcome issues that may arise from using traditional FSO devices to exchange free space radio frequency signals. In one implementation, RIFSO devices may be deployed in a non-standard fashion in conformal arrangements on various surfaces. They may be made unnoticeable to the public and may not require wired power sources or fiber connections.

Figure 1:
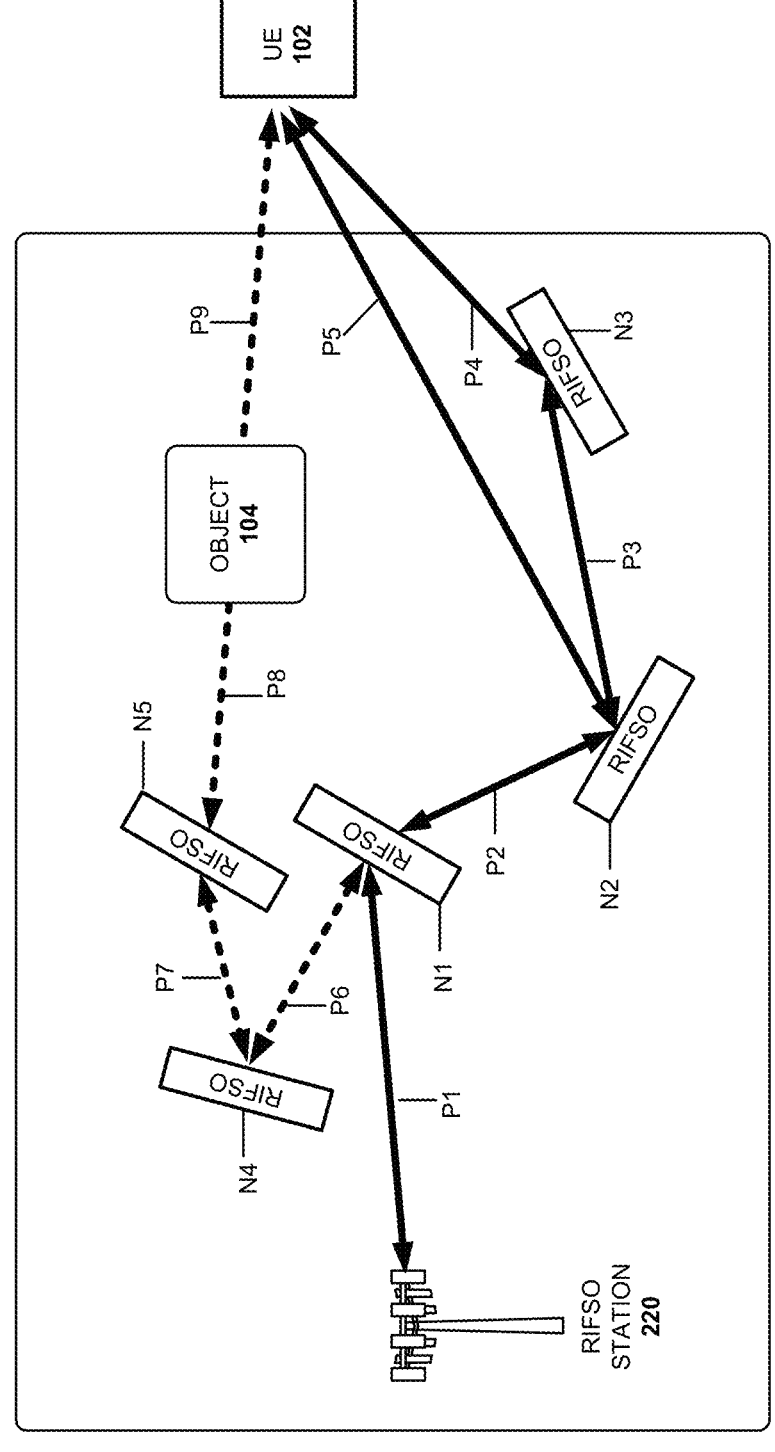
FIG. 1 illustrates concepts described herein.

FIG. 1 illustrates the concepts described herein. As shown, RIFSO nodes 205 (also referred to as a RIFSO network 205) may include a RIFSO station 220, RIFSO devices N1 through N5, and a User Equipment device (UE) 102 (e.g., a fixed wireless access (FWA) device). Depending on the implementation, RIFSO nodes 205 may include additional or fewer devices with similar or different configurations than those illustrated in FIG. 1.

RIFSO station 220 may transmit or receive Radio Frequency (RF) signals in the desired frequency range (e.g., mmWave). RIFSO station 220 may be capable of directing RF signals or beams in particular directions and receiving them from particular directions. Once configured, RIFSO devices N1-N5 may be capable of receiving RF beams from set incident angles and reflecting them at the programmed angles. If a single beam arrives at the surface of a RIFSO device, the RIFSO device may be capable of directing portions of the beam in different directions. As further explained below, each RIFSO device may be programmed in accordance with configuration messages. UE 102 may include a communication device. UE 102 is described in greater detail below.

As further shown, the RIFSO devices are configured and arranged to provide various partial paths P1 through P9 for RF signals (or beams) originating from RIFSO station 220 or RF signals originating from UE 102. For example, RIFSO station 220 may direct an RF signal to UE 102 via partial paths P1, P2, P3, and P4. An RF beam that originates from RIFSO station 220 may travel to RIFSO device N1 over P1, be reflected to RIFSO device N2 over P2, and reach UE 102 via P3 and P4. Each of RIFSO devices N1 through N3 may be configured to have RF beams follow the paths P1 through P4. RF signals that originate from UE 102 may reach RIFSO station 220 via the same paths but in the reverse direction.

In contrast to typical transmissions from base stations, RF beams from RIFSO station 220 may be more directed. For example, RIFSO station 220 may transmit its signals with less power and yet have them reach UE 102 due to less dispersion. Additionally, with multiple RIFSO devices located strategically, RIFSO devices N1 through N5 may permit RF signals from RIFSO station 220 to reach UE 102 via multiple paths. For example, RF beams travelling from RIFSO device N1 to RIFSO device N2 may reach UE 102 over two paths: a path comprising P3 and P4 and a path comprising P5. With the two available paths, in the event that the path P3, P4 or the path P5 becomes unavailable, RF beams may nonetheless reach UE 102 over the other path. Furthermore, RIFSO devices N1 through N5 may be configured to circumvent obstacles in beam paths. For example, an RF beam that originates from RIFSO station 220 may be unable to reach UE 102 over the path comprising P6, P7, P8, and P9 due to object 104 (e.g., a source of RF interference) that blocks partial path P9. RIFSO devices N1 through N5 may circumvent object 104 via path P1, P2, P3, and P4.

Although FIG. 1 shows a five RIFSO devices, one UE 102, and one RIFSO station 220, in practice, RIFSO network 205 may include additional or fewer RIFSO devices, UEs 102, and/or RIFSO stations 220. Furthermore, RIFSO devices, UEs 102, and/or RIFSO stations 220 may be arranged to provide different paths and circumvent different obstacles.

Figure 2:
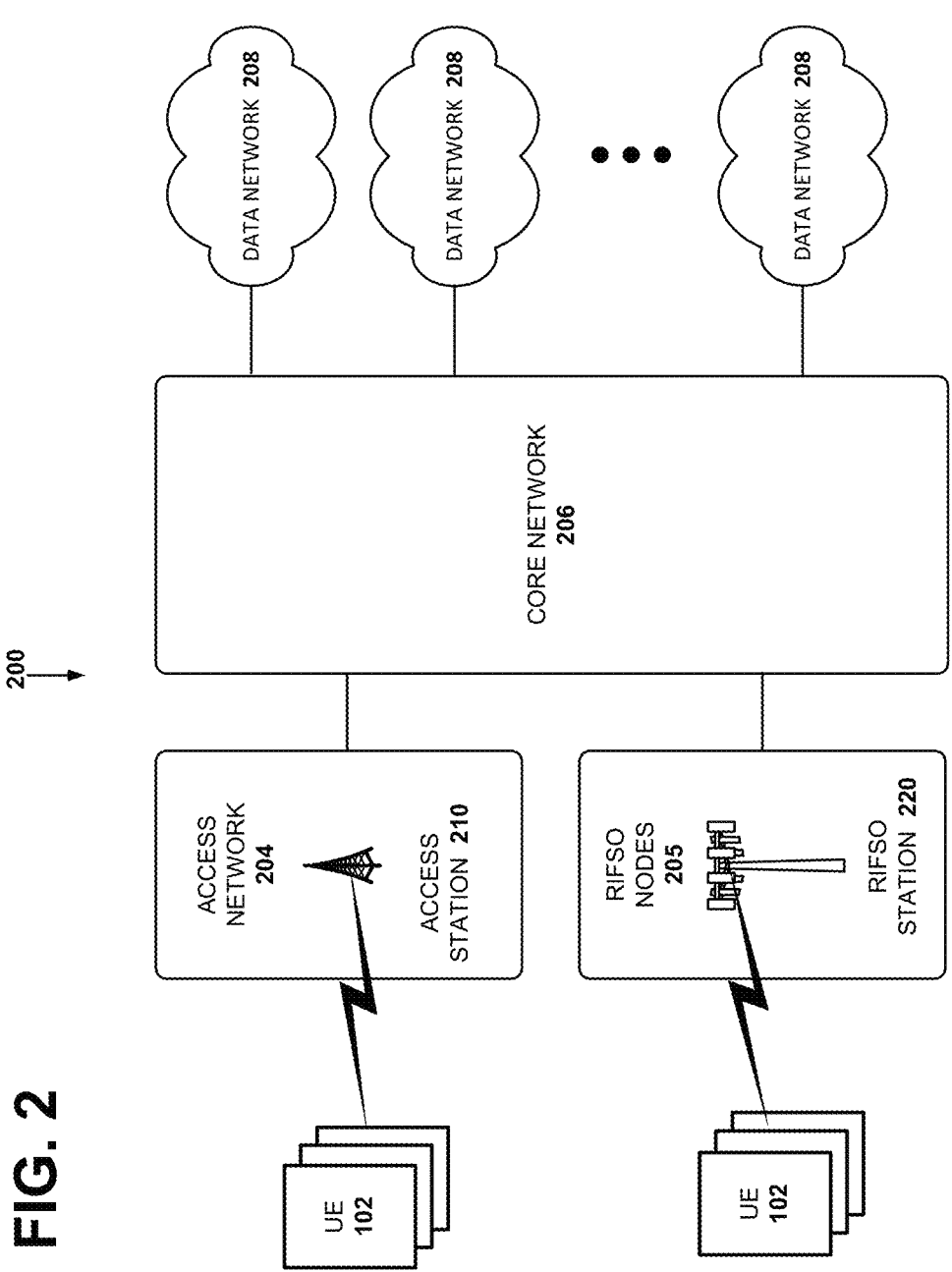
FIG. 2 illustrates an exemplary network environment in which systems and methods described herein may be implemented.

FIG. 2 illustrates an exemplary network environment 200 in which systems and methods described herein may be implemented. As shown, network environment 200 may include one or more of UE 102 (collectively referred to as UEs 102 and generically as UE 102), access network 204, RIFSO nodes 205, a core network 206, and one or more of data network 208 (collectively referred to as data networks 208 or generically as data network 208). Although not shown in FIG. 2, access network 204, RIFSO nodes 205, core network 206, and data networks 208 may be part of a provider network. If the provider network includes a cellular network, the provider network may be associated with or assigned a particular Public Land Mobile Network (PLMN) identifier (ID).

UEs 102 may include wireless communication devices capable of 4G (e.g., Long-Term Evolution (LTE)) communication, 5G New Radio (NR) communication, 6G communication, and/or another type of communication. Examples of UE 102 include: a Fixed Wireless Access (FWA) device; a Customer Premises Equipment (CPE) device with 4G, 5G, and/or 6G capabilities; an IoT device (e.g., sensor, a controller, an autonomous vehicle, etc.); a wireless Machine-Type-Communication (MTC) device that communicates with other devices over a machine-to-machine (M2M) interface, such as LTE-M or Category M1 (CAT-M1) devices and Narrow Band (NB)-IoT devices; a smart phone; a tablet device; a wearable computer device (e.g., a smart watch); a global positioning system (GPS) device; a laptop computer; a media playing device; and a portable gaming system.

Access network 204 may allow UE 102 to access core network 206. To do so, access network 204 may establish and maintain, with participation from UE 102, an over-the-air channel with UE 102; and maintain backhaul channels with core network 206. Access network 204 may relay information through such channels, from UEs 102 to core network 206 and vice versa. Access network 204 may include an LTE radio network and/or a 5G NR network, or another advanced radio network. These networks may include many central units (CUs), distributed units (DUs), radio units (RUs), and wireless stations, one of which is illustrated in FIG. 2 as access station 210 for establishing and maintaining over-the-air channels with UEs 102. In some implementations, access station 210 may include a 4G, 5G, or another type of base station (e.g., gNB, eNB, etc.) that includes one or more RF transceivers. In some implementations, access station 210 may be part of an evolved Universal Mobile Telecommunications Service (UMTS) Terrestrial Radio Access Network (eUTRAN).

RIFSO nodes 205 (also referred to as RIFSO network 205) may include one or more RIFSO devices and/or RIFSO stations 220. As described above, RIFSO nodes 205 may deliver signals to/from UEs 102 from/to core network 206. Operating parameters of RIFSO nodes 206 (e.g., RIFSO devices) may be set by one or more components of core network 206. The user plane part of RIFSO nodes 206 may be implemented in a manner similar to the user plane part of access network 204.

Core network 206 may manage communication sessions of subscribers connecting to core network 206 via access network 204 and/or RIFSO network 205. For example, core network 206 may establish an Internet Protocol (IP) connection between UEs 102 and data networks 208. The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a virtual network function (VNF) virtual machine, a Cloud Native Function (CNF) container, an event driven serverless architecture interface, and/or another type of SDN component. The common shared physical infrastructure may be implemented using one or more devices 1000 described below with reference to FIG. 10 in a cloud computing center associated with core network 206. Core network 206 may include 5G core network components, 4G core network components, and/or another type of core network components (e.g., 6G core network components). Some of 5G core network components are described in greater detail below with reference to FIG. 3.

Data networks 208 may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 102 and may establish communication sessions with UEs 102 via core network 206.

For clarity, FIG. 2 does not show all components that may be included in network environment 200 (e.g., routers, bridges, wireless access points, additional networks, additional access stations 210, RIFSO stations 220, data centers, portals, etc.). Depending on the implementation, network environment 200 may include additional, fewer, different, or a different arrangement of components than those illustrated in FIG. 2.

Figure 3:
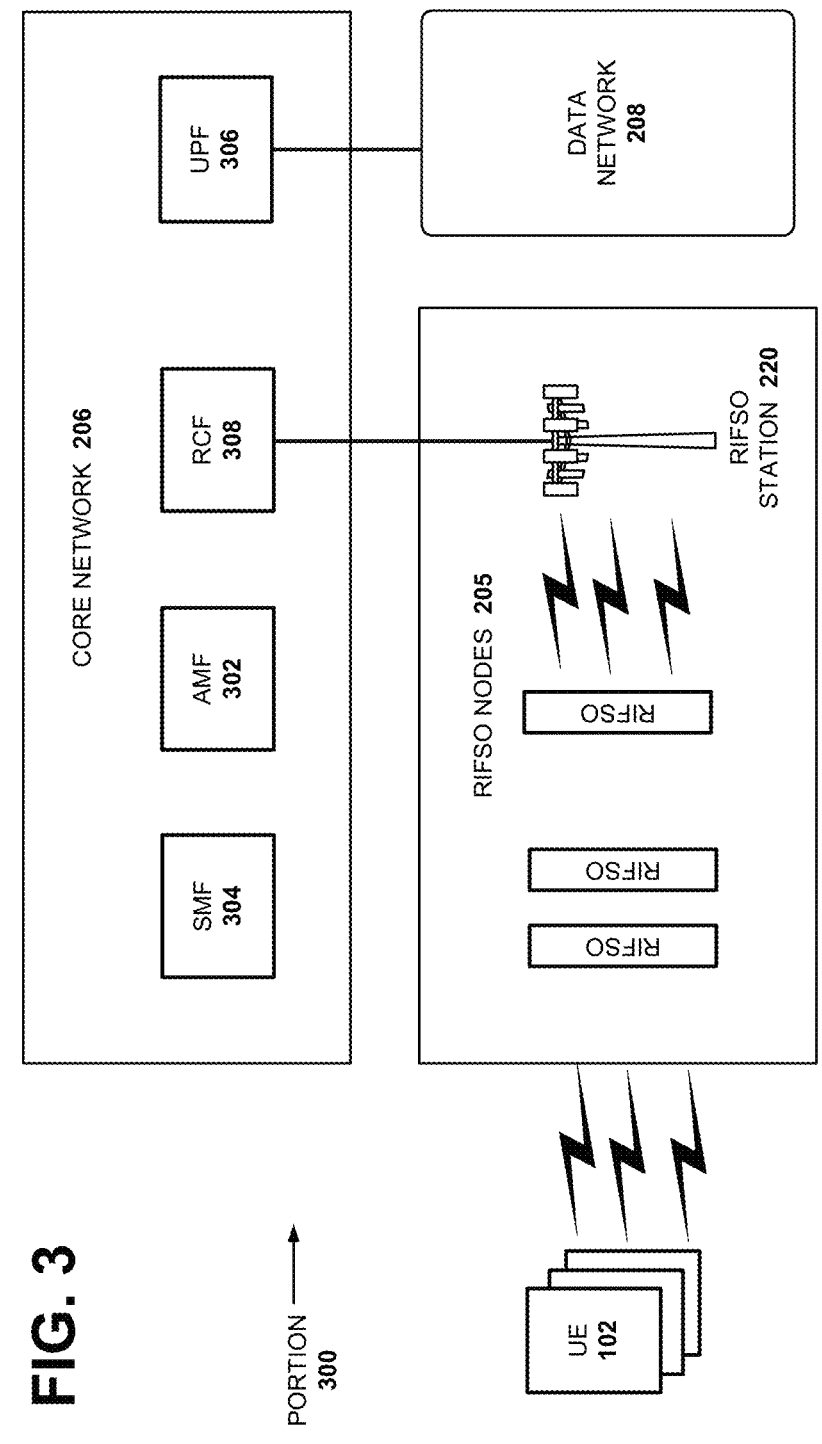
FIG. 3 depicts a portion of a network environment, according to an implementation.

FIG. 3 depicts a portion of network environment 200. In addition to showing UE 102, RIFSO nodes 205, core network 206, and data network 208, FIG. 3 also shows components of core network 206. As shown, core network 206 may include Access and Mobility Management Function (AMF) 302, a Session Management Function (SMF) 304, a User Plane Function (UPF) 306, and RIFSO Control Function (RCF) 308. Although core network 206 may include additional core network components, they are not illustrated for clarity. For example, in some implementations, core network 206 may include 4G core network components (e.g., a Mobility Management Entity (MME), a Home Subscriber Server HSS), a Serving Gateway (SGW), etc.), additional 5G core network components (e.g., a Charging Function (CHF), an Authentication Server Function (AUSF), a Policy Control Function (PCF), etc.), or another types of core network components.

AMF 302 may perform registration management, connection management, reachability management, mobility management, lawful intercepts, Short Message Service (SMS) transport between UE 102 and a Short Message Service Function (SMSF), session management messages transport between UE 102 and SMF 304, access authentication and authorization, location services management, functionality to support non-Third Generation Partnership Program (3GPP) access networks, and/or other types of management processes.

In one embodiment, to support the operation of RIFSO nodes 205, AMF 302 may use the N1 interface to communicate with UEs 102 attached to RIFSO nodes 205 and N2 interface to RIFSO station 220, in a manner similar to that for communicating with access stations 210 and UEs 102 attached to access stations 210. In a different embodiment, in supporting the operation of RIFSO nodes 205, AMF 302 may implement a new interface (e.g., a RIFSO(R1) interface to UEs 102 and R2 interface to RIFSO stations 220. R1 and R2 interfaces may be similar to N1 and N2 interface but may specify the particular RCF 308 managing the RIFSO station 220 to which UE 102 is attached.

SMF 304 may perform session establishment, session modification, and/or session release, perform Internet Protocol (IP) address allocation and management, perform Dynamic Host Configuration Protocol (DHCP) functions, perform selection and control of UPF 306, configure traffic steering at UPF 306 to guide the traffic to the correct destinations, terminate interfaces toward a PCF, perform lawful intercepts, charge data collection, support charging interfaces, control and coordinate charging for data collection, terminate session management parts of Non-Access Stratum (NAS) messages, perform downlink data notification, manage roaming functionality, and/or perform other types of control plane processes for managing user plane data.

UPF 306 may maintain an anchor point for intra/inter-Radio Access Technology (RAT) mobility, maintain an external protocol data unit (PDU) point of interconnect to a particular data network (e.g., data network 208), perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, forward an "end marker" to a RAN node (e.g., a base station), and/or perform other types of user plane processes.

In one embodiment, to support the operation of RIFSO nodes 205, UPF 306 may use N3 interface to RIFSO stations 220. In a different embodiment, to support the operation of RIFSO nodes 205, UPF 306 may implement a new interface (e.g., a RIFSO(R3) interface to RIFSO station 220. R3 interface may be similar to N3, but it may specify the particular RCF 308 managing the RIFSO station 220.

RCF 308 may manage RIFSO stations 220. For performance of its management functions, RCF 308 may include a database of parameters of each managed RIFSO station 220 and RIFSO devices. The RIFSO device parameters may include, for example, its location information (e.g., X, Y, and Z coordinates of the RIFSO device), the orientation of the RIFSO device (e.g., an azimuthal angle and a polar angle), and/or other configuration parameters values (e.g., position and orientation of the elements that the RIFSO device comprises).

RCF 308 may be provided with information associated with UEs 102, RIFSO devices, RIFSO stations, and potential signal-interfering objects in the coverage areas of RIFSO nodes 205. The information may include, for example, a set of location coordinates of UEs 102, RIFSO devices, RIFSO stations 220, and the potential signal-interfering objects. Given desired signal characteristics of RF beam paths from RIFSO stations 220 to UEs 102, RCF 308 may determine or select, for each RIFSO device and RIFSO station 220 in the RIFSO nodes 205, its configuration parameters. RCF 308 may select the configuration parameters so that each RIFSO station 220 may direct its beams to a set of UEs 102 and receive signals from the UEs 102. To configure the RIFSO devices and/or RIFSO stations 220, RCF 308 may send control messages to each of the RIFSO devices and RIFSO stations 220 via a control channel. In addition, RCF 308 may receive monitoring signals or sensor signals from the RIFSO devices and RIFSO stations 220.

Figure 4:
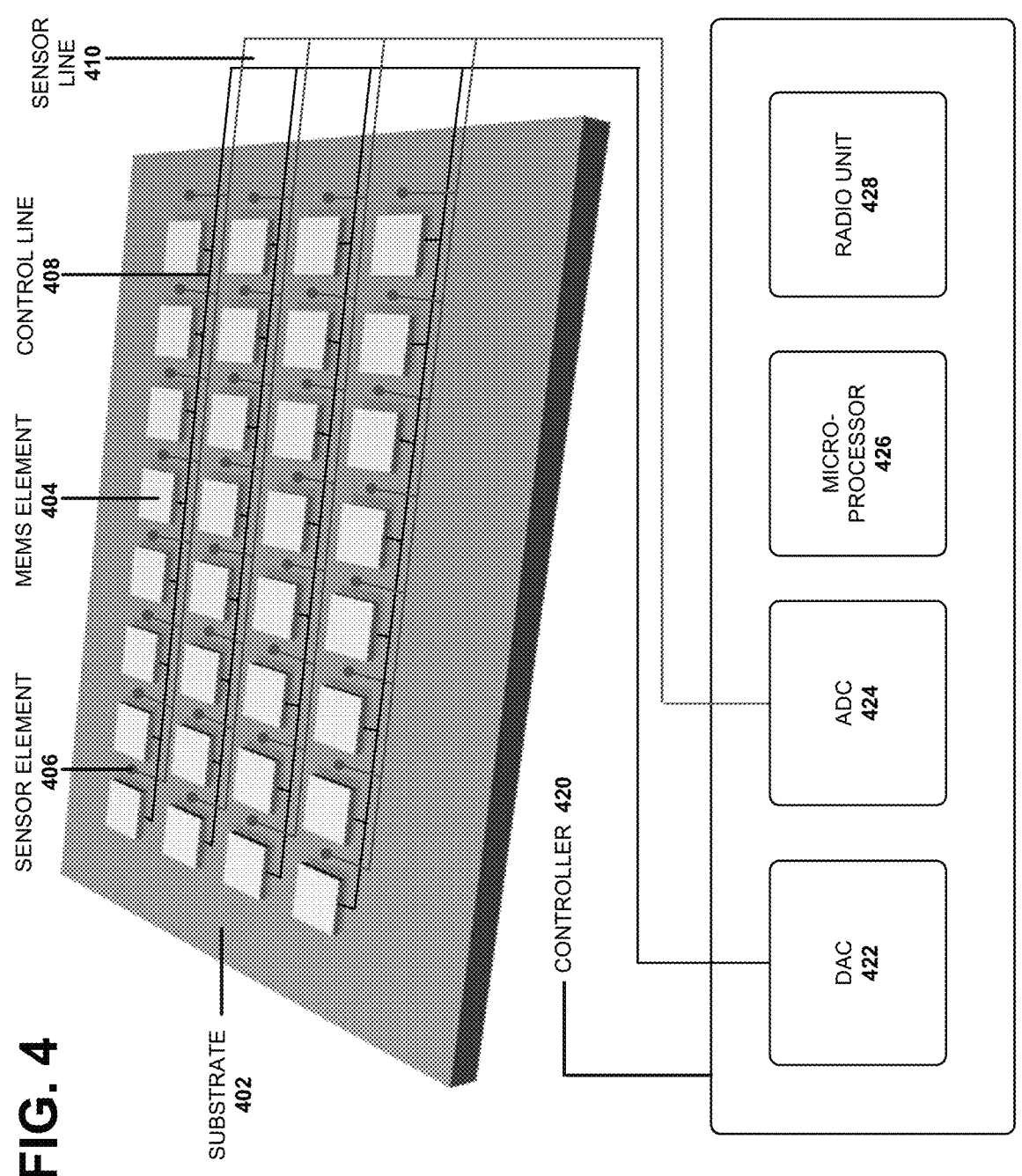
FIG. 4 illustrates example components of a Reconfigurable Intelligent Surface Free Space Optics (RIFSO) device, according to an implementation.

FIG. 4 illustrates example components of a RIFSO device 400, according to an implementation. As shown, RIFSO device 100 may include a substrate 402, an array of Microelectromechanical system (MEMS) elements 404, sensor elements 406, control lines 408, sensor lines 410, and controller 420. Depending on the implementation, RIFSO device 400 may include additional, fewer, different, or a different arrangement of components than those illustrated in FIG. 4. For example, the shape of substrate 402 and the arrangement of various buses (e.g., control lines 408 and/or sensor lines 410) may be different in other implementations. In another example, RIFSO device 400 may include components (e.g., screws, straps, etc.) for attaching RIFSO device 400 to a fixture, such as a tower, a pole, or a building surface.

Substrate 402 (also referred to as a board 402) may provide a frame or a structure on which the components of RIFSO device 400 may be affixed. MEMS element 404 may include reflecting surface element. Each MEMS element 404 may have a position or a location within RIFSO device 400. The surface of MEMS element 404 may be set at particular azimuthal and polar angles in accordance with control signals provided over one or more of control lines 408. Although MEMS element 404 is illustrated as being spaced apart from other MEMS elements, in practice, the size of the gaps between MEMS elements 404 may be larger or smaller, depending on the acceptable level of reflection of an RF beam that the MEMS element 404 is required to provide.

Sensor element 406 may obtain various signals that indicate the states of a corresponding MEMS elements. Although shown as a single black circle, sensor element 406 may comprise one or more sensing devices or mechanisms. In one example, a sensor element 406 may sense the intensity of RF signal on the surface of MEMS element 404; or the orientation angles of MEMS element 404; or another parameter associated with MEMS element 404.

Control lines 408 may carry control signals from controller 420 to MEMS element 404. The control signals may configure each MEMS element 404. For example, control lines 408 may carry the voltages for setting the orientation angles of MEMS element 404, such as the azimuthal angle and the polar angle of MEMS element 404. Sensor lines 406 may carry the signals indicating the monitored states of MEMS element 404.

Controller 420 may receive control messages (e.g., configuration messages) from RCF 308 over a control channel or send control messages (e.g., reporting messages) to RCF 308 over the control channel. For example, when controller 420 receives a configuration message from RCF 308, controller 420 may configure the host RIFSO device 400, such the orientations of MEMS elements 404 in accordance with the information provided in the configuration message. In another example, controller 420 may obtain the sensor parameter values from sensor elements, generate reporting messages that include the sensor parameter values, and send the reporting messages to RCF 308 over the control channel.

In some implementations, controller 420 may send or receive configuration and reporting messages that pertain not only to MEMS elements 404 or sensor elements 406, but also to other components of RIFSO device 400. For example, a reporting message may include coordinates of RIFSO device 400, information indicating a battery level (if RIFSO device 400 is powered via the battery), an error code (e.g., a code that indicates malfunction of one or more of MEMS elements 404, a code indicating the reflectivity of MEMS element 404, etc.).

As further shown, controller 420 may include a control line digital-to-analog converter (DAC) 422, a sensor line analog-to-digital converter (ADC) 424, a microprocessor 426, and a radio unit 428. Control line DAC 422 may receive normalized configuration parameter values from microcontroller 426, convert them to analog signals, and provide the analog signals to MEMS elements 404 over control lines 408. Sensor line ADC 424 may receive sensor signals from sensor elements 406 over sensor lines 410, convert the received signals (which are analog) into digital signals, and provide the signals to microprocessor 426.

Microprocessor 426 may process digitized sensor signals ADC 424, convert them into sensor parameter values, package the sensor parameter values into reporting messages, and send them to radio unit 428 for transmission. Conversely, microprocessor 426 may receive configuration messages from radio unit 428, obtain configuration parameter values from the messages, normalize the configuration parameter values, and provide the normalized configuration parameter values to control line DAC 422, to be sent as analog signals to MEMS elements 404 over control lines 408. Radio unit 428 may provide a radio communication interface to microprocessor 426. When radio unit 428 receives control signals (e.g., via its antenna), radio unit 428 may perform the necessary processing (e.g., signal acquisition, modulation/demodulation, etc.) to obtain the configuration messages from the signals and provide the messages to microprocessor 426. Conversely, when microprocessor 426 provides reporting messages to radio unit 428, radio unit 428 may performs the necessary processing for transmission of the reporting message as RF signal and transmit the RF signal over the control channel via its antenna.

Figure 5:
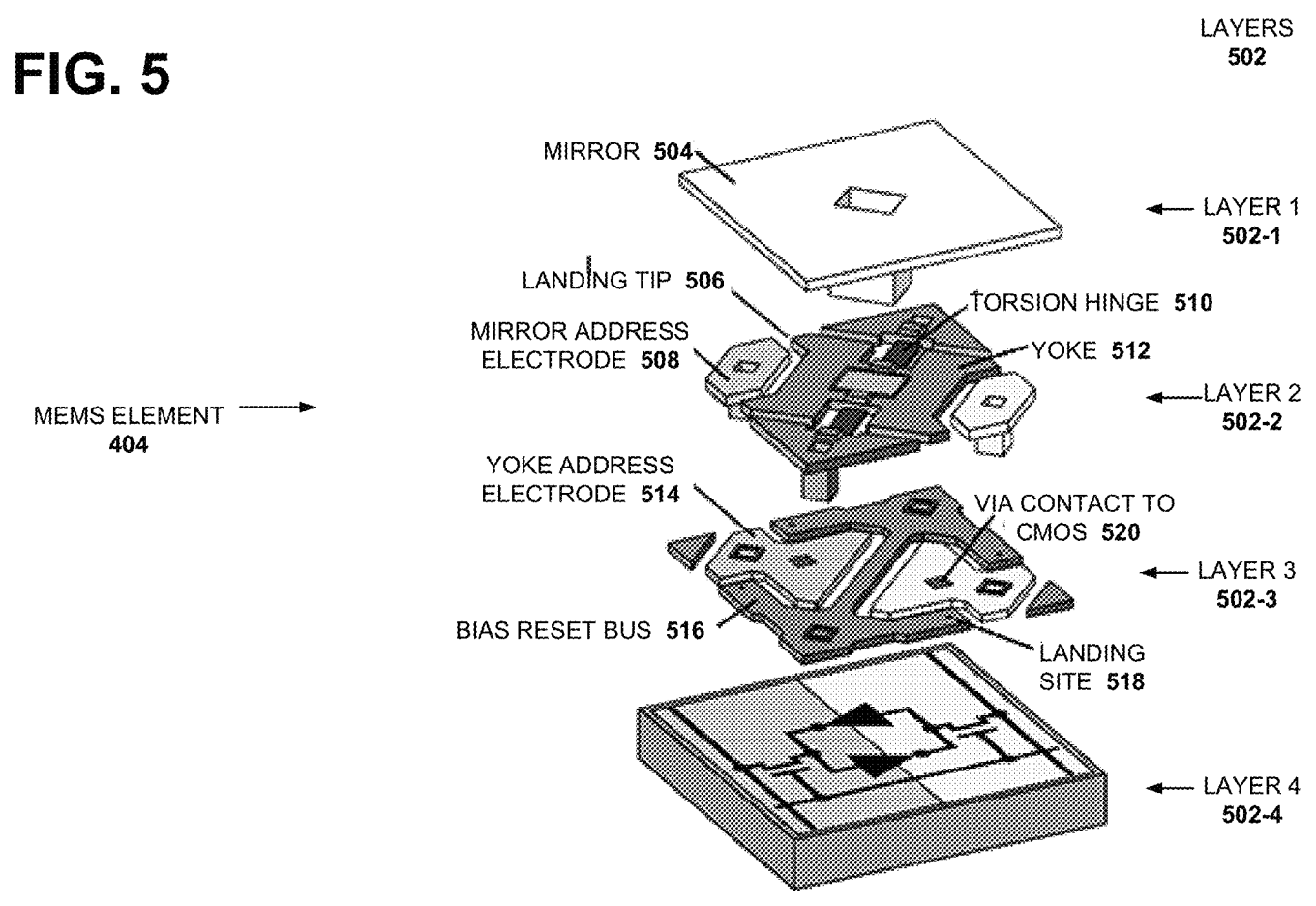

FIG. 5 depicts example components of MEMS element 404, according to an implementation. As shown, MEMS element 404 may comprise multiple layers—layer 502-1 through 502-4. Depending on the implementation, MEMS element 404 may include additional or fewer layers, with each layer comprising similar or different components than those illustrated in FIG. 5. Layer 502-1 includes a mirror 504. Mirror 504 may comprise a material with a particular level of reflectivity over specified spectra.

Layer 502-2 may include components for receiving control signals and for configuring layer 502-1 of MEMS element 404 based on the control signals. More specifically, layer 502-2 may include landing tips 506, mirror address electrodes 508, a torsion hinge 510, and a yoke 512. Landing tips 508 may provide a mechanism for the placement of layer 502-1 components, such as a mirror 504. Address electrode 508 may permit control signals for the mirror to reach layer 502-2 and configure torsion hinge 510. Torsion hinge 510 and yoke 512 provide mechanical components for setting azimuthal and polar angles for MEMS element 404.

Layer 502-3 may include yoke address electrodes 514, a bias-reset bus 516, via contact to complementary metal oxide semiconductor (CMOS) 518, and landing site 520. Yoke address electrodes 514 may permit control signals for the mirror to reach layer 502-3 and configure yoke 512. Bias reset bus 516 may include a line for resetting the bias of the CMOS of layer 502-4. Via contact to CMOS 518 may provide a contact point for the CMOS of layer 502-4. Landing site 520 may provide a mechanism for the placement of layer 502-3 over layer 504-4. Layer 504-4 may include CMOS devices to store charges in accordance with the control signals.

FIG. 6A depicts example control signals for a MEMS elements 404 of RIFSO device 400, according to an implementation. As shown, MEMS elements 404 are arranged in a matrix of R1-RN rows and C1-CM columns. Each MEMS element 404, at a particular row and a particular column may, store control signals as voltages/charges, although in FIG. 6A, the signals are shown as a pair of numerical values.

In one implementation, when controller 420 in RIFSO device 400 receives a configuration message from RCF 308, controller 420 may extract configuration parameter values and set the control signals (e.g., via control lines 410 and DAC 422) for MEM elements 404. For example, control signals may set the azimuthal and polar angles of a MEMS element 404. In FIG. 6A, the control signals for a MEMS element 404 (located at a particular column C and row R) are shown as pair of numbers that represent the orientation of the mirror 504—although what are stored at MEMS element 404 are charges. Each MEMS element 404 may maintain the orientation corresponding to the stored charges at the CMOS layer 502-4 until another set of control signals is sent by controller 420 to the MEMS element 404.

Figure 6B:
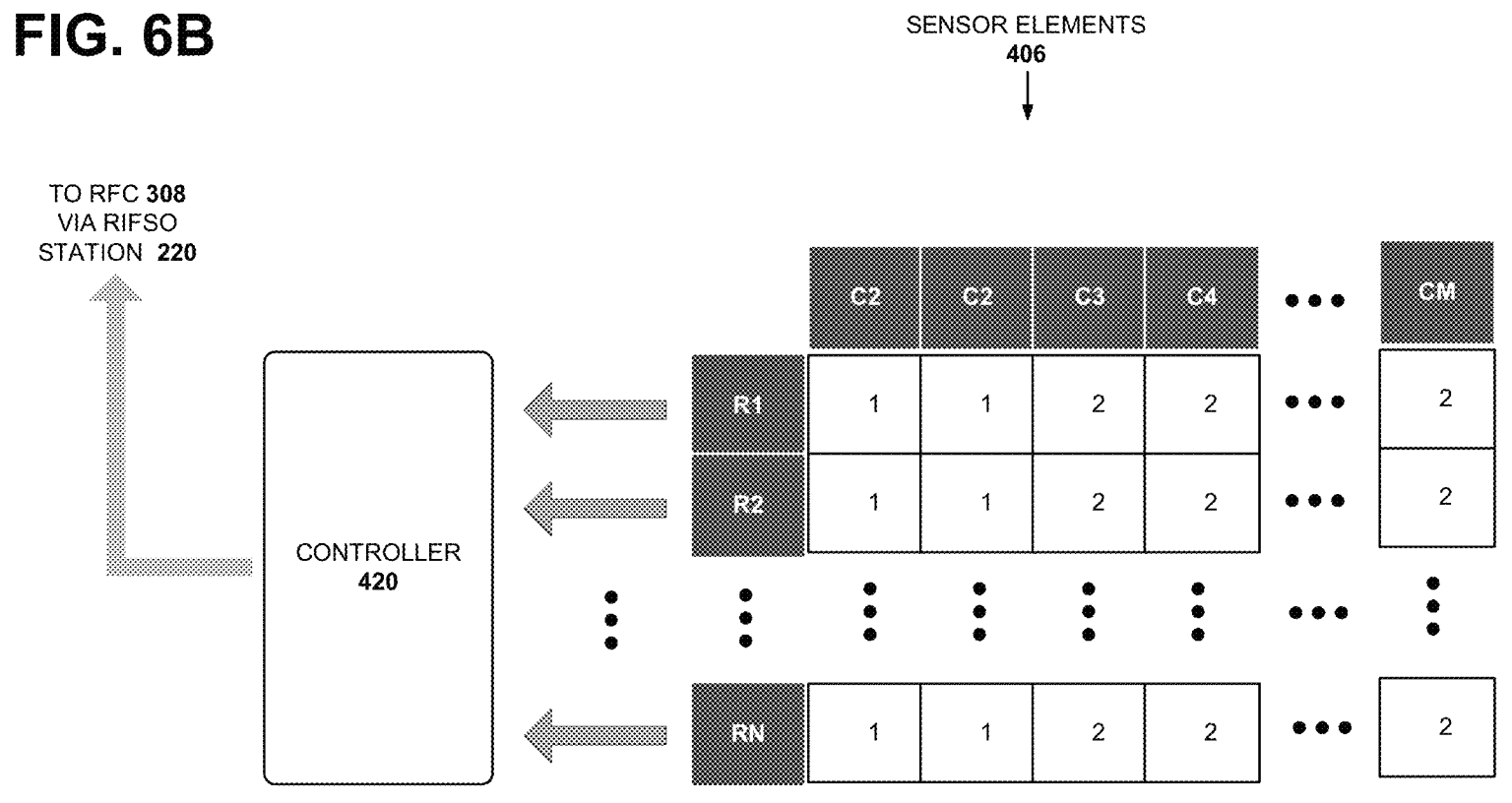

FIG. 6B depicts example detected signals at sensor elements 406 of RIFSO device 400, according to an implementation. As shown, sensor elements 406 are arranged in a matrix of R1-RN rows and C1-CM columns. Each sensor element 406, at a particular row and a particular column, may provide sensed signals (e.g., as a voltage), although in FIG. 6B, the sensed signals are shown as numerical values.

In one implementation, controller 420 in RIFSO device 400 may receive sensor signals detected at sensor elements 406. Controller 420 may obtain numerical values corresponding to the sensor signals via sensor line ADC 424, convert the numbers into sensor parameter values, package the values in one or more reporting messages, and send the reporting messages via radio unit 428 to RCF 408. In one implementation, each of the sensor parameter values may represent the intensity of light (e.g., in dB) detected by the sensor element 406 for the corresponding MEMS element 404.

Figure 7:
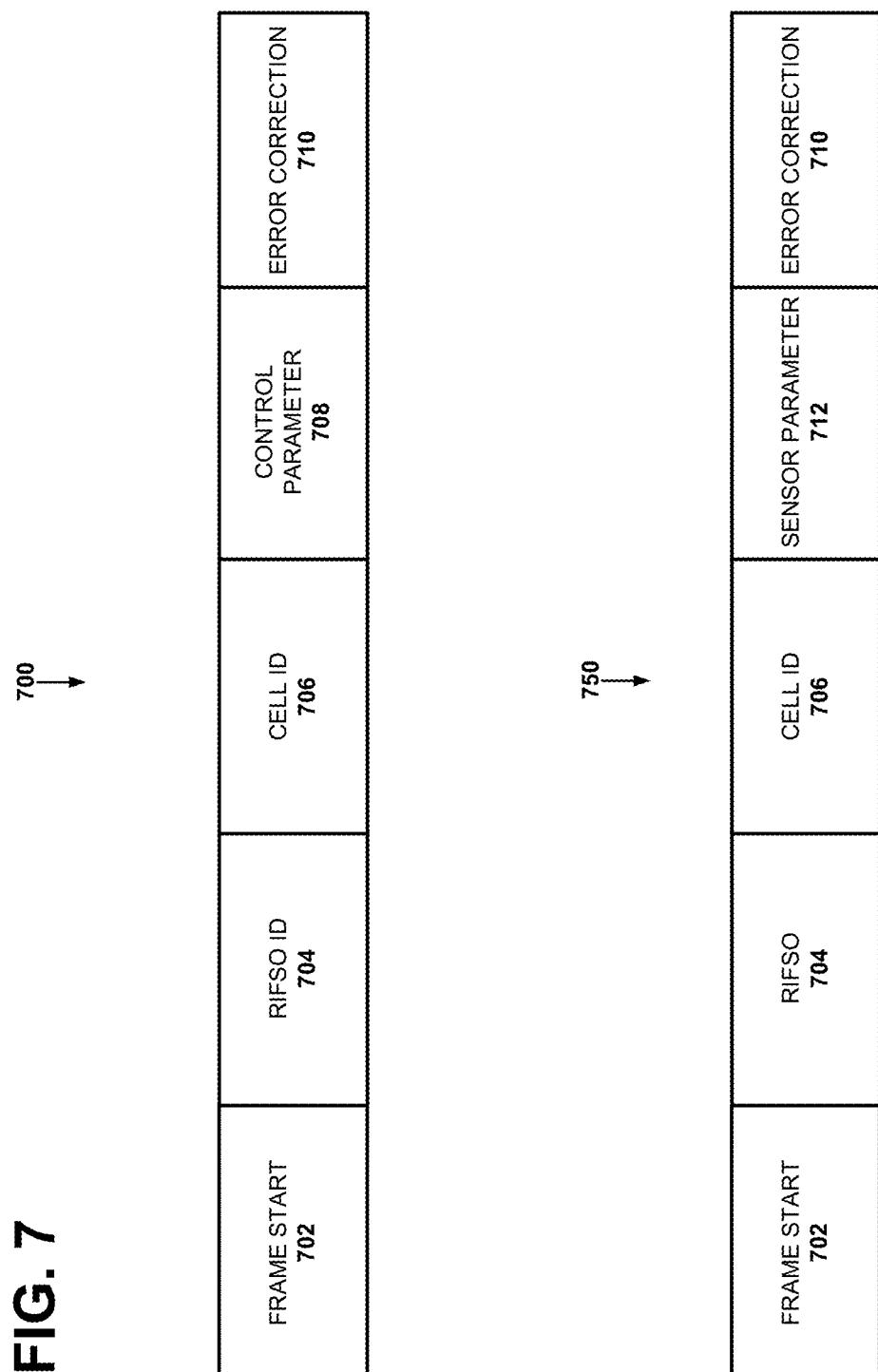
FIG. 7 depicts example RIFSO control frames, according to an implementation.

FIG. 7 depicts example RIFSO control frames 700 and 750, according to an implementation. As explained previously, RCF 308 may send or receive control messages to/from each RIFSO device 400 over a control channel (e.g., RF channel). These control messages may be implemented as control frames 700 or 750. Control frame 700 may comprise a configuration message sent from RCF 708 to RIFSO device 400. As shown, control frame 700 may include a frame start field 702, a RIFSO device ID field 704, a cell ID field 706, configuration parameter values field 708, and an error correction field 710. Control frame 750 may include a reporting message sent from RIFSO device 400 to RCF 308. As shown, control frame 750 may include mostly the same fields as control frame 700, except that, in place of configuration parameter values field 708, control frame 750 includes sensor parameter values field 712.

Start of Frame field 702 may include data/information that indicates the start of a new frame. For example, start of frame field 702 may include a uniquely identifiable bit pattern, such as 0xEEEEEEEE in hexadecimal. RIFSO device ID field 704 may store unique identifier for each RIFSO device 400. In one implementation, RIFSO device ID field 704 may include a Media Access Control (MAC) address or a serial number of the RIFSO device 400 from/to which the control frame 700/750 originates/is addressed.

Cell ID field 706 may specify either a MEMS element 404 or a sensor element 406 within the RIFSO device 400. For example, cell ID 706 may specify a row and a column in the MEMS array of the RIFSO device 400 (i.e., two numbers). Configuration parameter values field 708 may include the values of configuration parameter values of MEMS element 404, such as the azimuthal angle and the polar angle; and sensor parameter values field 712 may include the values of sensors parameters of sensor elements 406, such as a light level in dB. Error correction code field 710 may include an error correction code, such as a Cyclic Redundancy Code (CRC) or a forward error correction (FEC) code.

Depending on the implementation, control frames 700 and/or 750 may include additional or different fields than those illustrated in FIG. 7. For example, in one implementation, control frames 700/750 may include a field for specifying a number of cells, followed by pairs of fields specifying a cell ID and its associated parameter value. In another example, control frames 700/750 may include a field indicating whether the control message relates to MEMS elements 404 or sensor elements 406, followed by pairs of cell ID and its corresponding values. In another implementation, if RIFSO device 400 includes a power source (e.g., a battery), control frame 700 may include a field that indicates whether the data included in frame 700 refers to a battery level or another parameter that pertains a state of RIFSO device 400.

Figure 8:
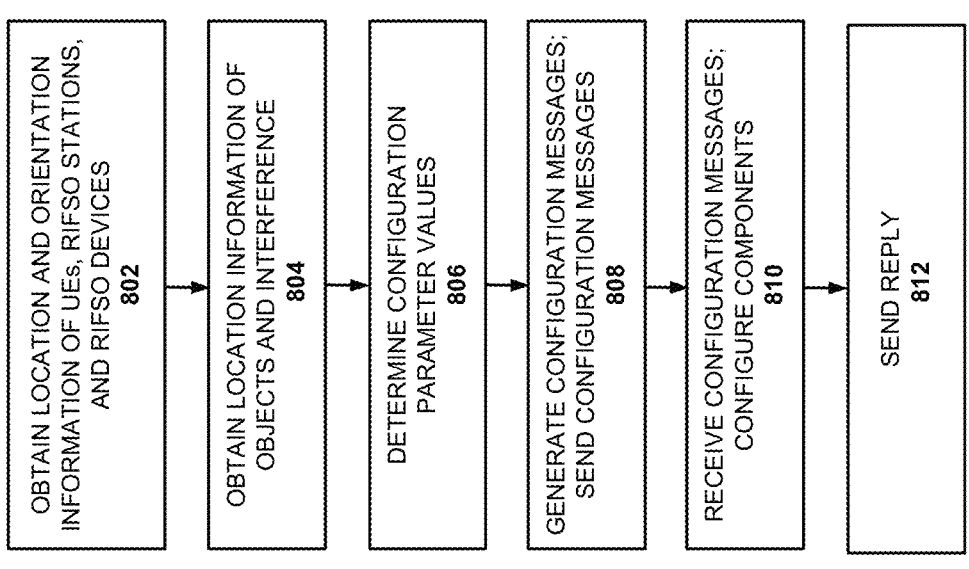
FIG. 8 is a flow diagram of an exemplary process that is associated with configuring RIFSO devices, according to an implementation.
Figure 8:

FIG. 8 is a flow diagram of an exemplary process 800 that is associated with configuring RIFSO devices 400, according to an implementation. Process 800 may be performed by devices of FIGS. 1-6B, including RIFSO station 220, RIFSO devices 400, RCF 308, and their components (e.g., see FIG. 5). As shown, process 800 may include RCF 308 obtaining location and orientation information of UEs 102 (e.g., UEs 102 that may access RIFSO network 205), RIFSO stations 220, RIFSO devices 400, and/or their components (block 802). For example, in one implementation, RCF 308 may obtain the location information and orientation information for each of the RIFSO devices 400 and RIFSO stations 220 in RCF nodes 205, RCF 308 may obtain the information from a database in core network 206 or from a network administrator.

Process 800 may further include RCF 308 obtaining the locations of objects and RF interference in the coverage areas of the RIFSO network 205 (block 804). Similarly as in block 802, RCF 308 may obtain the information from one or more components in core network 206, data network 208, and/or a network administrator.

RCF 308 may determine the configuration parameter values for RIFSO stations 220, RIFSO devices 400, and/or the UEs 102 based on the location and orientation information for RIFSO stations 220, RIFSO stations 400, UEs 102, objects in the coverage areas of RIFSO nodes 205, and interference in coverage areas of RIFSO network 205 (block 806). The configuration parameters may include information/data that specifies, for example, the orientation of MEMS elements 404 for each of RIFSO devices 400 and the orientation of RF beam-forming mechanisms in RIFSO stations 220. The configuration parameter values may be chosen for establishing optimal beam paths from each of the RIFSO stations 220 to UEs 102 via RIFSO devices 400. For example, RCF 408 may determine the orientation angles (e.g., azimuthal and polar angles) of MEMS elements, for each RIFSO devices 400. The angles are chosen for the establishment of reliable signal paths from RIFSO stations 220 to UEs 102. The paths may circumvent, avoid, or minimize the effects of the presents of the objects or the interference in the coverage areas of RIFSO network 205.

RCF 308 may generate configuration messages for RIFSO stations 220 and RIFSO devices 400 (block 808) and send the generated configuration messages to RIFSO stations 220 and RIFSO devices 400 over the control channel (block 808). For example, RCF 308 may generate control frames 700 that specify the orientation of MEMS elements 404 of a RIFSO device 400 using the configuration parameter values determined at block 806. Thereafter, RCF 308 may send the generated configuration messages to each of RIFSO devices 400 that are to be configured. In addition, RCF 308 may send configuration messages to RIFSO stations 220. The configuration messages for RIFSO stations 220 may be similar to control frames 700 but tailored for configuring components of RIFSO stations 220, such as the orientation of the beam-forming elements or the strength of its beams.

RIFSO stations 220 and RIFSO devices 400 may receive the configuration messages from RCF 308 over the control channel (block 810). For example, RIFSO devices 400 may receive control frames 700 that are addressed to RFISO devices 400. A RIFSO device 400 may detect a control frame 700 that is addressed to the RIFSO device 400 by matching the value of RIFSO device ID field 704 of the frame 700 to the ID stored in the RIFSO device 400.

Process 800 may further include RIFSO devise 400 and RIFSO stations 220, which received control messages, configuring its components (block 810). For example, a RIFSO device 400 that receives a control frame 700 may extract configuration parameters values (e.g., azimuthal and polar angles) of its MEMS elements 404 from the frame 700. Furthermore, the RIFSO device 400 may configure the MEMS elements 404 based on the extracted configuration parameter values. More specifically, RIFSO device 400 may set the voltages at control lines 408 to appropriate values to orient MEMS element 404 in the direction specified by the configuration parameter values. After the MEMS elements 404 are configured, the RIFSO device 400 may send an acknowledgement (e.g., a reply) to RCF 308 over the control channel (block 812), indicating that the requested configuration has been performed.

Figure 9:
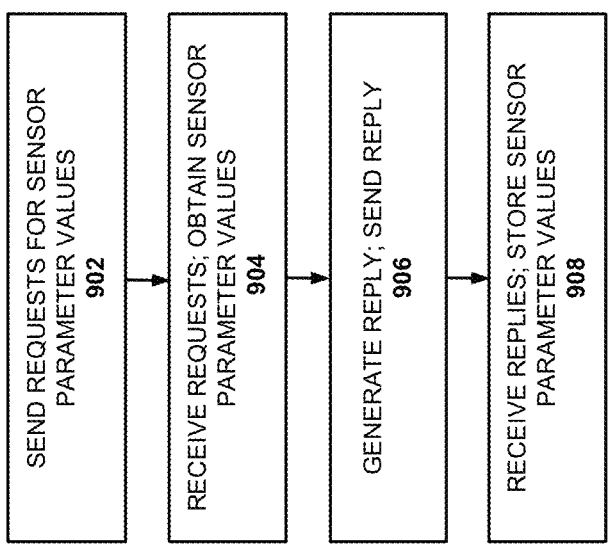
FIG. 9 is a flow diagram of an exemplary process that is associated with obtaining sensor parameter values of RIFSO devices, according to an implementation.
Figure 9:

FIG. 9 is a flow diagram of an exemplary process 900 that is associated with obtaining sensor parameter values of RIFSO devices 400, according to an implementation. Process 900 may be performed by devices of FIGS. 1-6B, including RIFSO station 220, RIFSO devices 400, RCF 308, and their components (e.g., see FIG. 5). As shown, process 900 may include RCF 308 sending a request for sensor parameter values to RIFSO stations 220 and/or RIFSO devices 400 over the control channel (block 902). Each request may comprise a control frame, similar to those described above with respect to FIG. 7. The control frame may specify the sensor elements 406 or components (of RIFSO device 400 or RIFSO station 220) for which the parameter values are requested.

RIFSO device 400 or RIFSO station 220 may receive a request for sensor parameter values (block 904). When a RIFSO device 400 or a RIFSO station 220 receives a request, the RIFSO device 1400 may obtain the sensor parameter values for each of the sensor elements identified in the request (block 904). For example, a RIFSO device 400 may obtain sensor parameter values of sensor elements 406 by reading the signals from sensor lines 410 for the sensor elements 406 identified in the request and converting the signals into sensor parameter values.

After obtaining the sensor parameter values for the components specified in the request, RIFSO device 400 or RIFSO station 220 may generate a reply (block 906). For example, a RIFSO device 400 may generate, for each of the sensor elements 406 specified in the request, a control frame 750 that includes the sensor parameter value (e.g., a light level). Alternatively, as discussed above, if the reply is in a format that includes multiple fields for the sensor parameter values, the reply may include the sensor parameter values for all of the sensor elements 406 specified in the request. After generating the reply (or replies), RIFSO device 400 or RIFSO station 220 may send the reply to RCF 308 over the control channel (block 906).

Process 900 may further include RCF 308 receiving the replies from RIFSO stations 220 and/or RIFSO devices 400 (block 908). Upon receiving the replies, RCF 308 may store, for each of the RIFSO devices 400 and/or RIFSO stations 220 from which the replies were received, the sensor parameter values provided in the replies (block 908). The values may be stored along with timestamps. Later, analyses may be performed on the sensor parameter values to detect anomalies or issues for maintenance, replacement, or reconfiguration.

Figure 10:
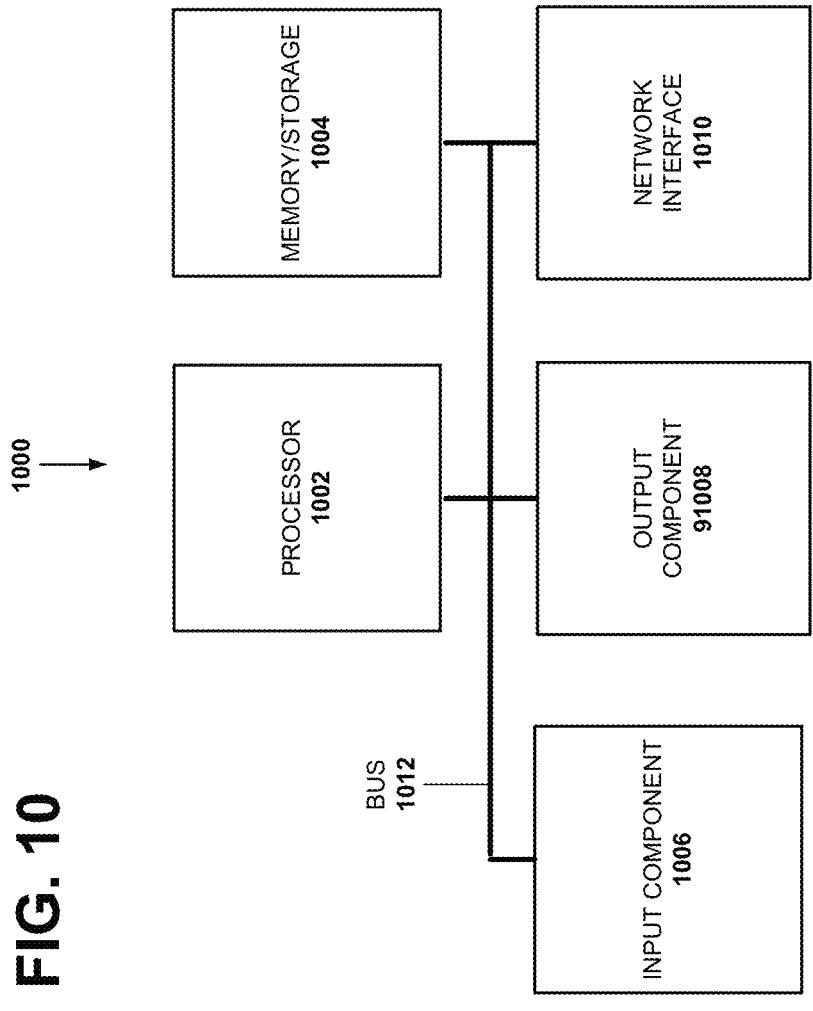
FIG. 10 depicts exemplary functional components of a network device according to an implementation.

FIG. 10 depicts exemplary components of a network device 1000. Network device 1000 may include, correspond to, and/or be included in any of the devices and/or components illustrated in FIGS. 1-6 (e.g., UE 102, core network 206, data network 208, access station 210, RIFSO station 220, RIFSO devices 400, RCF 308, etc.). In some implementations, network devices 1000 may be part of a hardware network layer on top of which other network layers and network functions (NFs) may be implemented. As shown, network device 1000 may include a processor 1002, memory/storage 1004, input component 1006, output component 1008, network interface 1010, and bus 1012 (also referred to as communication path 1012). In different implementations, network device 1000 may include additional, fewer, different, or different arrangement of components than the ones illustrated in FIG. 10. For example, network device 1000 may include line cards, switch fabrics, modems, etc.

Processor 1002 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 1000 and/or executing programs/instructions.

Memory/storage 1004 may include static memory, such as read only memory (ROM), and/or dynamic memory, such as random access memory (RAM), or onboard cache, for storing data and machine-readable instructions (e.g., programs, scripts, etc.). Memory/storage 1004 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1004 may be external to and/or removable from network device 1000. Memory/storage 1004 may include, for example, a Universal Serial Bus (USB) memory stick, a dongle, a hard disk, off-line storage, a Blu-Ray® disk (BD), etc. Memory/storage 1004 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 1006 and output component 1008 may provide input and output from/to a user to/from network device 1000. Input/output components 1006 and 1008 may include a display screen, a keyboard, a mouse, a speaker, a microphone, a camera, a DVD reader, USB lines, and/or other types of components for obtaining, from physical events or phenomena, to and/or from signals that pertain to network device 1000.

Network interface 1010 may include a transceiver (e.g., a transmitter and a receiver) for network device 1010 to communicate with other devices and/or systems. For example, via network interface 1010, network device 1000 may communicate over a network, such as the Internet, an intranet, cellular, a terrestrial wireless network (e.g., a WLAN, WIFI, WIMAX, etc.), a satellite-based network, optical network, etc. Network interface 1010 may include a modem, an Ethernet interface to a LAN, and/or an interface/connection for connecting network device 1000 to other devices (e.g., a Bluetooth interface).

Communication path or bus 1012 may provide an interface through which components of network device 1000 can communicate with one another.

Network device 1000 may perform the operations described herein in response to processor 1002 executing software instructions stored in a non-transient computer-readable medium, such as memory/storage 1004. The software instructions may be read into memory/storage 1004 from another computer-readable medium or from another device via network interface 1010. The software instructions stored in memory/storage 1004, when executed by processor 1002, may cause processor 1002 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. Accordingly, the specification and drawings are to be regarded in an illustrative rather than restrictive sense.

In the above, while a series of blocks have been described with regard to the processes illustrated in FIGS. 8 and 9, the order of the blocks and associated processing may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a first plurality of microelectromechanical system (MEMS) elements, wherein each of the MEMS elements includes a mirror configured to reflect a radio frequency (RF) signal propagating through a free space to the mirror and whose surface orientation is configurable based on signals from a controller; and
the controller configured to:
    receive a configuration message from a cellular network component over a RF control channel;
    extract configuration parameter values, for one or more of the MEMS elements, from the configuration message; and
    configure the one or more of the MEMS elements by sending control signals corresponding to the configuration parameter values to the one or more of the MEMS elements,
    wherein the configuration message comprises a configuration frame that includes:
        a first configuration field that includes an identifier for the device;
        a second configuration field that includes an identifier for one of the MEMS elements; and
        a third configuration field that includes particular configuration parameter values for the one MEMS element.

2. The device of claim 1, wherein the particular configuration parameter values include at least:
numbers that specify a direction of the mirror of the one MEMS element.

3. The device of claim 2, wherein the numbers include:
a number specifying an azimuthal angle of the mirror.

4. The device of claim 1, further comprising:
a second plurality of sensor elements, wherein each of the sensor elements is coupled to one of the MEMS elements, wherein each of the sensor elements is configured to obtain signals that indicate one or more states of the corresponding MEMS element.

5. The device of claim 4, wherein the controller is further configured to:
obtain sensor parameter values based on signals from the sensor elements;
generate a control message that includes the sensor parameter values; and
send the generated control message to the cellular network component over the control channel.

6. The device of claim 5, wherein the generated control message includes:
a control frame comprising a plurality of fields that include:
    a first control field that includes an identifier for the device;
    a second control field that includes an identifier for one of the sensor elements; and
    a third control field that includes sensor parameter values obtained from the one of the sensor elements.

7. The device of claim 6, wherein the sensor parameter values include a number that specifies an intensity of a radio frequency signal incident on a MEMS element corresponding to the one of the sensor elements.

8. The device of claim 1, wherein the device includes a reconfigurable intelligent surface free space optical (RIFSO) device, wherein the RIFSO device is one of a plurality of RIFSO devices, and wherein the cellular network component is configured to:
determine configuration parameter values for the plurality of RIFSO devices based on physical locations of the RIFSO devices, one or more RIFSO stations, and User Equipment devices (UEs);
generate configuration messages for the plurality of RIFSO devices based on the determined configuration parameter values; and
forward the configuration messages to the plurality of RIFSO devices to configure the RIFSO devices.

9. The device of claim 8, wherein when the cellular network component determines the configuration parameter values for the plurality of RIFSO devices, the cellular network component determines the configuration parameter values based on paths that RF signals will follow from the one or more RIFSO stations to the UEs via the RIFSO devices.

10. A method comprising:

receiving, at a device, a configuration message from a cellular network component over a radio frequency (RF) control channel, wherein the device comprises:

a first plurality of microelectromechanical system (MEMS) elements, wherein each of the MEMS elements includes a mirror configured to reflects a RF signal propagating through a free space to the mirror and whose surface orientation is configurable;

extracting configuration parameter values, for one or more of the MEMS elements, from the configuration message; and configuring the one or more of the MEMS elements by sending control signals corresponding to the configuration parameter values to the one or more of the MEMS elements, wherein the configuration message comprises a configuration frame that includes:

a first configuration field that includes an identifier for the device;

a second configuration field that includes an identifier for one of the MEMS elements; and a third configuration field that includes particular configuration parameter values for the one MEMS element.

11. The method of claim 10, wherein the particular configuration parameter values include at least:

numbers that specify a direction of the mirror of the one MEMS element.

12. The method of claim 11, wherein the numbers include:

a number specifying an azimuthal angle of the mirror.

13. The method of claim 10, wherein the device further comprises:

a second plurality of sensor elements, wherein each of the sensor elements is coupled to one of the MEMS elements, wherein each of the sensor elements is configured to obtain signals that indicate one or more states of the corresponding MEMS element.

14. The method of claim 13, further comprising:

obtaining sensor parameter values based on signals from the sensor elements;

generating a control message that includes the sensor parameter values; and sending the generated control message to the cellular network component over the control channel.

15. The method of claim 14, wherein the generated control message includes:

a control frame comprising a plurality of fields that include:

a first control field that includes an identifier for the device;

a second control field that includes an identifier for one of the sensor elements; and a third control field that includes sensor parameter values obtained from the one of the sensor elements.

16. The method of claim 15, wherein the sensor parameter values include a number that specifies an intensity of a radio frequency signal incident on a MEMS element corresponding to the one of the sensor elements.

17. The method of claim 10, wherein the device includes a reconfigurable intelligent surface free space optical (RIFSO) device, wherein the RIFSO device is one of a plurality of RIFSO devices, and wherein the cellular network component is configured to:

determine configuration parameter values for the plurality of RIFSO devices based on physical locations of the RIFSO devices, one or more RIFSO stations, and User Equipment devices (UEs);

generate configuration messages for the plurality of RIFSO devices based on the determined configuration parameter values; and forward the configuration messages to the plurality of RIFSO devices to configure the RIFSO devices.

18. A system comprising:

a first network device included in a cellular network; and a second network device comprising:

a first plurality of microelectromechanical system (MEMS) elements, wherein each of the MEMS elements includes a mirror configured to reflect a radio frequency (RF) signal propagating through a free space to the mirror and whose surface orientation is configurable based on signals from a controller; and the controller configured to:

receive a configuration message from the first network device over a RF control channel;

extract configuration parameter values for one or more of the MEMS elements, from the configuration message; and configure the one or more of the MEMS elements by sending control signals corresponding to the configuration parameter values, to the one or more of the MEMS elements, wherein the configuration message comprises a configuration frame that includes:

a first configuration field that includes an identifier for the device;

a second configuration field that includes an identifier for one of the MEMS elements; and a third configuration field that includes particular configuration parameter values for the one MEMS element.

19. The system of claim 18, wherein the particular configuration parameter values include at least: numbers that specify a direction of the mirror of the one MEMS element.

20. The system of claim 18, wherein the numbers include: A number specifying an azimuthal angle of the mirror.

* * * * *